Sept. 4, 1934.  W. A. PATTON  1,972,632
THRUST PLATE FOR PUMPS
Filed Jan. 5, 1931
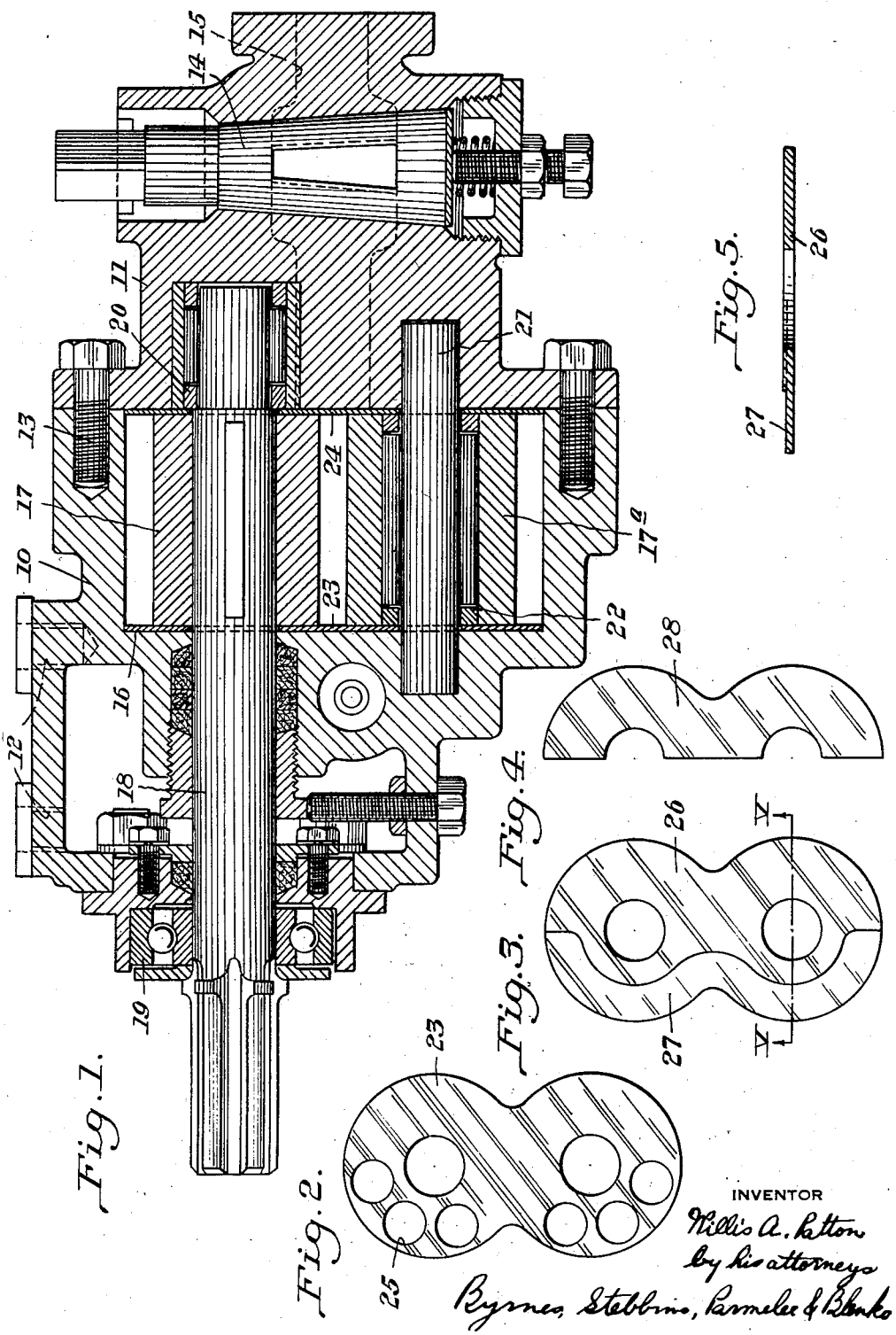
INVENTOR
Willis A. Patton
by his attorneys
Byrnes, Stebbins, Parmelee & Benko Patented Sept. 4, 1934

1,972,632

UNITED STATES PATENT OFFICE 1,972,632

THRUST PLATE FOR PUMPS

Willis A. Patton, Youngstown, Ohio, assignor to The Commercial Shearing & Stamping Company, Youngstown, Ohio, a corporation of Ohio Application January 5, 1931, Serial No. 506,519

6 Claims. (Cl. 103—126)

My invention relates to pumps, and especially to pumps of the impeller type or gear pumps.

In such pumps, the usual construction includes a cast pump housing having bearings for supporting rotary impellers or gears, one of which is adapted to be driven from an outside source, the other gear being driven by the externally driven gear. In order to prevent wear of the inner surface of the housing walls, and to seal the impellers, it has been found desirable to provide thrust plates between the ends of the impellers and the housing walls. These thrust or wear plates have the shape of the interior of the pump housing in transverse section and are provided with holes for receiving the shafts on which the impellers are mounted therein.

It has been found from experience with pumps of the type above described, that when the supply of fluid thereto is cut off, the pump can continue to operate only for a very short time before it overheats, so that the rotary impellers bind or freeze to the thrust or wear plates, after which further operation is impossible. This freezing appears to be an actual fusing of the metal of the impellers with that of the thrust plates, and is a direct result of the high temperature generated by the moving parts after the supply of fluid is withdrawn.

In some cases, where housings of pumps of the type mentioned have been attached as auxiliary devices to other pieces of mechanical equipment, as in the case of a power take-off attached to the transmission of a motor truck for operating a hydraulic hoist for the body thereof, the freezing of the pump rotor to the housing thereof causes serious injury to the transmission of the truck. In fact, instances have occurred where the continued rotation of the pump shaft actually broke the transmission casing with great damage thereto. The pump shaft has a torsional strength greater than the resistance of the transmission casing to fracture. Obviously, the repairs necessary after an occurrence of this kind are very expensive and, in addition, put the truck out of service for a considerable period.

From observations conducted with a number of pumps in which the impellers fused to the thrust plates, I have concluded that the pressure on the high pressure side of the pump is communicated to a film of fluid lying between the plate and the casing wall. On the high pressure or outlet side of the pump, the pressure of the fluid being delivered appears to balance the pressure tending to force the thrust plates against the ends of the impellers, while on the low pressure side there is no opposing pressure. The outlet pressure seems to be communicated to the entire outer face of the thrust plate to a thin film of fluid, but this pressure effects its serious damage only on the low pressure side where there is no pressure in the body of the pump to prevent the thrust plates from being pushed against the ends of the impellers too tightly.

This conclusion I draw from the fact that in no case that I have studied has the high pressure side of the pump shown any signs of freezing or fusion. In any case, when the supply of fluid is cut off, however, there appears to be a pressure developed behind the thrust plates of the lower pressure sides thereof, which tends to force them into intimate contact with the ends of the impellers. The resulting friction is responsible in my opinion for the fusion of the impellers to the thrust plates and the consequent freezing or sticking of the pump. In experiments with a particular type of pump, it has been found impossible to continue operation of the pump more than a half-minute at twelve hundred r.p.m. before freezing.

I have invented a novel type of thrust plate for rotary pumps which obviates the foregoing difficulties. In accordance with the invention, I provide the thrust plates of an impeller type pump with means for relieving any pressure that may be created tending to force the thrust plates against the ends of the impellers on the low pressure side of the pump. This means may take the form of a series of marginal perforations in the thrust plates. It may also be in the form of a marginal recess on the low pressure side of the thrust plates providing a free space between the plate and the housing wall. The recessed plate may also be perforated, if desired. I also contemplate employing a thrust plate which covers only approximately the high pressure half of the ends of the impellers, thus providing a free space between the ends of the impellers and the pump casing on the low pressure side thereof.

For a more complete understanding of the invention, reference is made to the accompanying drawing, in which Figure 1 is a longitudinal section through a pump of the impeller type and including thrust plates embodying the invention;

Figure 2 is a plan view of one of the present preferred forms of the invention;

Figure 3 is a similar view of an alternative form;

Figure 4 is a similar view of a still further modified form; and

Figure 5 is a sectional view along the line V—V of Figure 3.

Referring in detail to the drawing, the pump housing is made up of a main casting 10 and a cover casting 11. The main casting 10 is adapted to be secured to an auxiliary structure, such as the transmission casing of a motor truck, by screws which are adapted to enter tapped holes 12. The cover casting 11 is secured to the main casting 10 by screws 13 and is provided with a plug valve 14 controlling the outlet passage of the pump and an inlet passage 15.

The inlet passage 15 leads to a recess 16 in the casting 10 in which impellers 17 and 17a, in the form of intermeshed spur gears, are adapted to rotate. The gear 17 is mounted on a shaft 18, one end of which is journalled in bearings 19 seated in an opening in the casting 10. The end of the shaft projects through the bearing 19 and is adapted to be connected to a source of power, a power take-off on a motor truck, for example. The other end of the shaft 18 is journalled in a roller bearing 20 seated in a suitable recess in the cover casting 11. The impeller 17a is journalled on a shaft 21 and is provided with a roller bearing 22.

Between the ends of the impellers 17 and 18, and the inner surface of the pump casting, thrust plates 23 and 24 are positioned. The function of these plates is two-fold. In the first place, they serve as removable wear plates, and, secondly, they serve to seal the space occupied by the impellers 17 and 18 to prevent the loss of pressure therefrom. The sealing action of the thrust plates appears to be due to the transmission of the discharge pressure of the pump to a thin film of fluid between the thrust plates and the pump casing walls. When the supply of fluid is interrupted, friction develops which heats the ordinary thrust plates and impellers and finally fuses them together. This friction is apparently due to the pressure which seals joints between the impellers and the plates.

My invention provides means for relieving this pressure and in one form which has worked satisfactorily under tests, I provide marginal holes 25 on the low pressure side of the thrust plates. These holes appear to permit the sealing pressure behind the plates to escape and the result is that it becomes possible to continue operation of the pumps for a much longer period than when unperforated thrust plates are employed. The perforations 25 in the thrust plates do not entirely eliminate friction between the plates and the impellers, since, even with the perforations, the pump heats up in about two minutes. The friction, however, is not sufficient to heat the impellers or thrust plates to a temperature at which they are fused together and freeze. The injury and breakage resulting from freezing of pumps thus is obviated. Without the perforations the pumps would not run long enough to start smoking from the heat generated before the impellers would freeze to the casing.

Another form in which the invention may be embodied is shown in Figure 3, in which a thrust plate 26 is provided with a marginal recess 27 on the low pressure side. The plate is installed in the pump with the marginal recess adjacent the impeller ends on the low pressure side thereof. The recess prevents the building up of any substantial pressure behind the plate which would force it into intimate contact with the ends of the impellers to produce the disastrous results above described.

A still further form of thrust plate is shown at 28 of Figure 4. A thrust plate of this type may be formed by cutting away the entire low pressure side of either of the other types of plates. This type of plate is a positive preventative for the difficulty of freezing. Since the thrust plates do not project down to the lower pressure side, they obviously cannot freeze to the ends of the impellers. As previously stated, no difficulty is experienced on the high pressure side.

The invention has been tested and the results prove that it is a marked advance over rotary pumps as heretofore constructed. In no case has it been possible to freeze the impellers to the casing, although operation was continued long beyond anything that had been possible with other types of thrust plates. The invention is useful not only in cases where the supply of fluid to a pump is apt to be entirely cut off, but also to installations in which at times the pump circulates only a minimum of fluid under a considerable pressure, which produces substantially the same conditions as the complete interruption of the fluid supply. One such instance is in the case of a pump for operating a hydraulic jack for the dumping body of a vehicle. In an instance of this kind, when the jack is extended, a small amount of fluid circulates through the pump and returns through a relief valve as long as the pump is operated after the jack has been extended.

In addition to preventing freezing of the pump impellers, the use of a thrust plate in accordance with the invention reduces the pressure in the bearing recesses of the pump housing to one-third or one-fourth of the value which is common with former types of thrust plates. Another result is that the discharge pressure of the pump is reduced slightly but not sufficiently to materially affect the efficiency thereof.

Although I have illustrated and described but a few present preferred embodiments of the invention, it will be apparent that other embodiments thereof may be resorted to without departing from the scope of the invention, as set forth in the appended claims, or sacrificing the merits and advantages thereof. It will be possible, for example, to split the plate shown in Figure 2 transversely on a line perpendicular to the line joining the centers of the two circular ends of the plate. The two-piece plate thus formed is employed in exactly the same manner as is the one-piece plate shown in Figure 2. It is also possible to form the thrust plates integral with the bushings for the impeller shaft. This prevents leakage of fluid between the impellers and the thrust plates.

I claim:

1. In a gear type pump, the combination with geared impellers mounted in a housing, of thrust plates between the ends of the impellers and the housing wall, said plates having means extending circumferentially of the impeller on the low pressure side of the pump to relieve the fluid pressure tending to force the plates against the impellers on the low pressure side of the pump.

2. A pump comprising a casing, impellers rotatably mounted therein, thrust plates between the ends of the impellers and the wall of the housing, said plates being provided with means extending circumferentially of the impeller on the low pressure side of the pump for relieving the pressure created in the operation of the pump tending to force the plates against the impellers on the low pressure side of the pump.

3. In a pump of the impeller type having rotary impellers mounted in a housing, wear plates in the housing against which the ends of the impellers are adapted to bear, said plates being provided with a series of marginal holes extending circumferentially of the impellers on the low pressure side of the pump.

4. In a pump of the impeller type having rotary impellers mounted in a housing, wear plates in the housing against which the ends of the impellers are adapted to bear, said plates being cut away on the low pressure side to relieve the pressure created in the operation of the pump tending to force the plates against the impellers.

5. A thrust plate for an impeller type pump adapted to protect the wall of a housing from direct contact with the ends of the impellers, said plate having a marginal recess extending circumferentially of the impellers on the low pressure side.

6. The combination with a pair of impellers in a gear type pump, of thrust plates between the ends of the impellers and the pump casing, said thrust plates having a plurality of holes on the low-pressure side thereof, said holes being spaced uniformly from the edge of the plates.

WILLIS A. PATTON.